Nov. 13, 1928. 1,691,135
H. SCHLAICH
INSTRUMENT
Filed Nov. 10, 1921
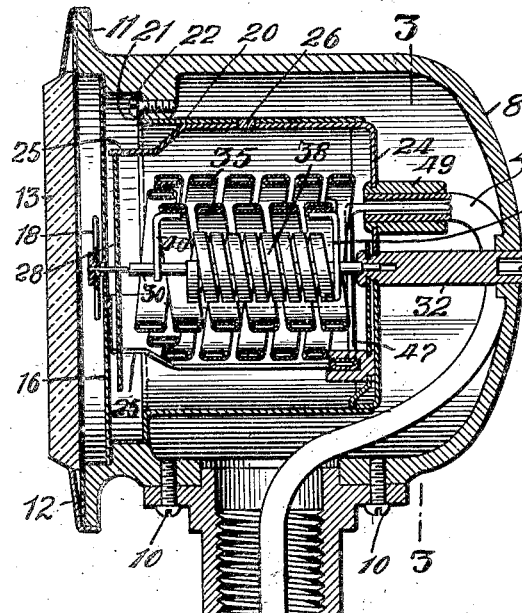
Fig. 1.
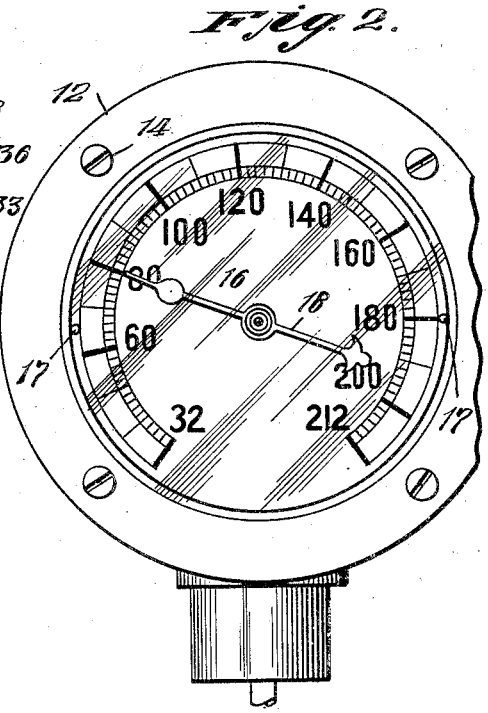
Fig. 2.
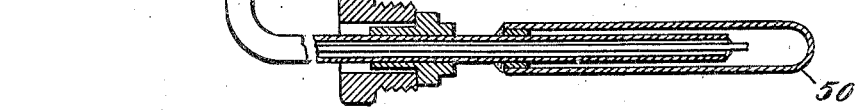
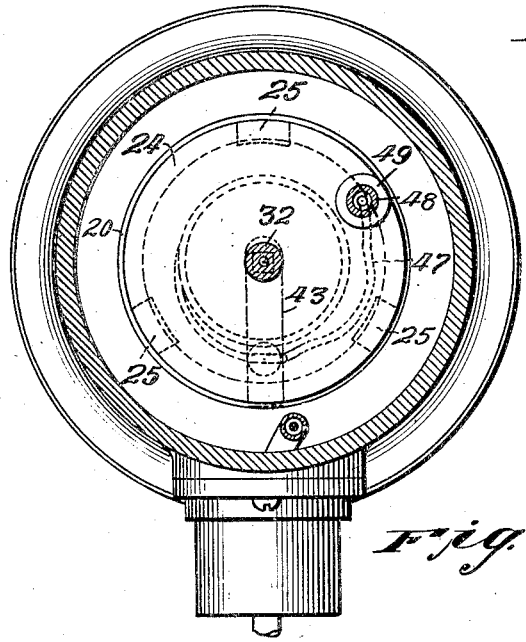
Fig. 3.
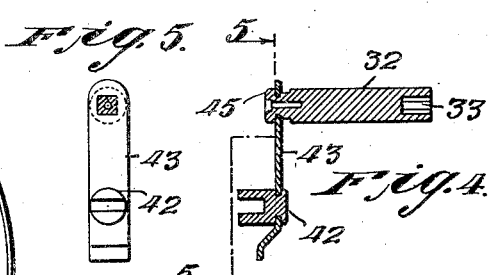
Fig. 4.
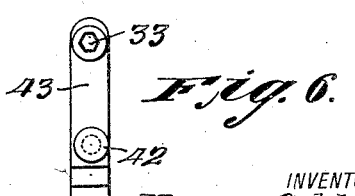
Fig. 6.
INVENTOR
Herman Schlaich
BY
ATTORNEYS Patented Nov. 13, 1928.

1,691,135

UNITED STATES PATENT OFFICE.

HERMAN SCHLAICH, OF LONG ISLAND CITY, NEW YORK.

INSTRUMENT.

Application filed November 10, 1921. Serial No. 514,196.

This invention relates to instruments, and particularly to indicating instruments such as thermometers, pressure gages and the like, containing a Bourdon tube operatively connected to an indicating member.

The invention is particularly applicable to, and may for that reason be considered an improvement on, the types of instruments described in my prior applications Serial No. 218,801 filed February 23, 1918, and Serial No. 293,265 filed April 28, 1919. In the instruments described in those applications, a helically coiled Bourdon tube is operatively connected at one end to an arbor and at the other end to a fixed support, and the arbor carries at one end a hand which moves over a scale on a dial plate. In assembling and calibrating these instruments, the hand is adjusted on the end of the arbor so as to point at the division on the scale corresponding to the temperature at which the instrument is being calibrated; and if at some future time re-calibration is necessary, it can only be accomplished by rotating the hand on the arbor, an act which requires the removal of the instrument crystal and which may injure the instrument if not properly done.

The general object of the present invention is to provide in an instrument of this general type means whereby calibration is facilitated and whereby re-calibration may be accomplished without removing the crystal or any part of the instrument casing and without adjusting the position of the hand on the arbor. In attaining this object, I provide an adjustable support to which one end of the Bourdon tube is connected, and by certain advantageous constructions provide for the adjustment of this support from without the instrument casing.

The invention will be understood from the following description taken in connection with the accompanying drawing in which, Figure 1 is a side sectional elevation of an instrument having the invention embodied therein; Figure 2 is a front elevation thereof; Figure 3 is a rear sectional elevation on the line 3—3 of Figure 1; Figure 4 is a sectional elevation of the adjustable member by which one end of the Bourdon tube is supported; Figure 5 is a sectional elevation on the line 5—5 of Figure 4; and Figure 6 is an end elevation of the part shown in Figure 4.

Referring to the drawing, the mechanism of the instrument is mounted within a casing 8 of the cylindrical form shown, to the bottom of which a pipe flange 9 is secured by screws 10. This flange 9 is intended to be secured to a pipe or bracket which will serve as a support for the instrument.

At its front end, the casing 8 is provided with a flange 11 to which a bezel 12, holding a crystal 13, may be secured by screws 14 or in any other suitable manner. Visible through the crystal 13 is a dial plate 16 which is secured to a shouldered portion on the inside of the casing 8, by means of screws 17 Fig. 2 or in any other suitable manner. Between the dial plate 16 and the crystal 13, a hand 18 is arranged for movement over the scale on the dial plate, this hand being secured to and supported on an arbor which is rotated in response to temperature variations by means which will hereinafter be described.

The mechanism of the instrument is mounted within an inner casing 20 having a flanged edge 21 adapted to cooperate with and be secured by screws 22 to an inwardly projecting flange on the inside of the casing 8. This inner casing 20 is adapted to receive a supporting frame which may comprise a cup-shaped back portion 24 and a plurality of axially extending arms 25. About midway of their length, the arms 25 are provided with lugs 26 adapted to engage holes in the inner casing 20; and cooperating with the outer ends of the arms 25 is a plate 28 having in its edge notches adapted to receive the ends of the arms 25. The parts 24, 25 and 28 together form a frame in which is mounted the arbor 30 which supports the hand 18. Each end of the arbor 30 is reduced in diameter, and at the front end this reduced portion of the arbor is journaled in a bearing formed by the plate 28; and at its rear end, the reduced portion of the arbor is journaled in a bearing which is rotatably supported in the back portion 24 of the frame. This bearing comprises a stud 32 which at its outer end extends through a hole in the back of the casing 8 and is provided with a key socket 33; and which at its inner end is reduced in diameter and passes through a hole in the frame member 24, this inner end of the bearing 32 being drilled so as to receive the reduced end of the arbor 30. Helically coiled around the arbor 30 is a Bourdon tube 35 which is wound with outer and inner helixes in a well known manner. One end of this tube is operatively connected to the arbor 30 through the medium of a lever 36, pivotally mounted on the arbor 30 and secured at one end to the end of the Bourdon tube and at its opposite end to one end of a temperature compensating helical spring 38 the other end of which is attached to the arbor 30. To assist in holding the front turns of the Bourdon tube in proper position concentric with the arbor 30, a lever 40 may be provided one end of which is secured to one of the turns of the Bourdon tube while the other end is pivotally mounted on the arbor 30. The other end of the Bourdon tube 35 is supported in a slotted lug 42 mounted in an arm 43 secured to and radially extending from the rotatably supported bearing 32. A satisfactory method of attaching the arm 43 to the bearing 32 is illustrated in detail in Figures 4 and 5, from which it will be apparent that the inner end of the bearing member 32 is squared and adapted to cooperate with a square hole in the arm 43, the end of the bearing member 32 being then riveted over the end of the arm 43 as shown at 45. The slotted lug 42 is attached to the arm 43 at a short distance from its outer end, and the latter is bent laterally as shown in Figures 1 and 4 so that it will extend over the edge of the back portion 24 and between two of the arms 25 of the supporting frame which serve to limit the rotary movement of said arm 43. Secured to the end of the Bourdon tube which is held in the slotted lug 42, is a capillary tube 47 which may be curved as shown in Figure 3 and which is carried out of the inner casing through a protecting pipe 48 which may be secured to the end portion 24 of the frame by means of a bushing 49. The capillary tube 47 and the protecting pipe 48 may be of any suitable length, and at their ends are provided with a bulb 50 of well known form, adapted to be inserted in the place the temperature of which is to be indicated by the instrument. The construction of the bulb 50 and its cooperating parts need not be further described since they form no part of the present invention.

With an instrument constructed as above described, it will be obvious that the location of the hand 18 for any calibrating temperature may be adjusted by inserting a key in the key socket 33 in the outer end of the rotatably supported bearing 32, and by turning this bearing. The angular movement thus imparted, through the bearing 32 and the arm 43 and the slotted lug 42, to one end of the Bourdon tube 35 will be transmitted through the Bourdon tube and through the compensating spring 38 to the arbor 30 carrying the hand 18. The initial calibration and any subsequent re-calibration of the instrument is thus facilitated, and removal of the crystal 13 and adjustment of the hand 18 on the arbor 30 is not necessary after these parts have been once assembled.

While I have illustrated and described one construction embodying my invention, it will be understood that I do not intend to limit myself to this specific construction, but that I intend by the appended claims to cover my invention in whatever form it may be embodied.

What I claim is:

1. In an instrument, a helically coiled Bourdon tube, an arbor to which one end of said tube is operatively connected, an indicator secured on the opposite end of said arbor, bearings in which the ends of said arbor are journaled, means for rotatably supporting one of said bearings, a support to which the other end of said tube is connected, and a connection between said support and said rotatably supported bearing for enabling the support, the tube, the arbor and the indicator to be adjusted as a unit by rotation of the bearing, the bearing being directly engageable for effecting such adjustment.

2. In an instrument, a helically coiled Bourdon tube, an arbor coaxial with the tube to which one end of said tube is operatively connected, an indicating pointer fast on the arbor, bearings in which the ends of said arbor are journaled, one of said bearings being rotatably supported, an arm fixedly secured to and extending radially from said rotatably supported bearing, and a support for the other end of said tube mounted upon said arm, to enable the coil to be adjusted by rotating the bearing, the bearing being directly engageable for effecting such adjustment.

3. In an instrument, a helically coiled Bourdon tube, an arbor to which one end of said tube is operatively connected, a pointer carried by the arbor, a frame, a bearing rotatably supported in said frame and forming a journal for the arbor, an arm fixedly secured to and extending outward from said rotatably supported bearing, and a support for the other end of said tube mounted on said arm, to enable the tube to be adjusted by rotation of the bearing, said bearing extending through the back of the instrument to the exterior thereof and being directly engageable to effect adjustment 4. In an instrument, a helically coiled Bourdon tube, an arbor to which one end of said tube is operatively connected, a frame in which one end of said arbor is journaled, a bearing in said frame in which the other end of said arbor is journaled, said bearing being rotatably mounted in said frame, a casing through which said rotatably mounted bearing extends, an arm secured to and radially extending from said rotatably mounted bearing, and a support for the other end of said tube mounted on said arm, the exteriorly exposed end of the bearing being provided with a key socket.

5. In an instrument, a helically coiled Bourdon tube, an arbor to which one end of said tube is operatively connected, a pointer carried by the arbor, a frame, bearings in said frame in which the ends of said arbor are journaled, one of said bearings being rotatably supported in said frame, an arm secured to and radially extending from said rotatably supported bearing, the outer end of said arm being adapted to engage said frame and to be limited in its movement thereby, and a support for the other end of said tube mounted on said arm, the rotatably mounted bearing being extended through the back of the instrument and provided with a key socket to enable an authorized person to adjust the mechanism from the exterior of the instrument.

In testimony whereof I have affixed my signature to this specification.

HERMAN SCHLAICH.